United States Patent [19]

Malik

[11] Patent Number: 5,319,536
[45] Date of Patent: Jun. 7, 1994

[54] POWER SYSTEM FOR PARALLEL OPERATION OF AC/DC CONVERTRS

[75] Inventor: Randhir S. Malik, Lexington, Ky.

[73] Assignee: International Business Machines Corporation, Armonk, N.Y.

[21] Appl. No.: 809,562

[22] Filed: Dec. 17, 1991

[51] Int. Cl.⁵ .......................................... H02M 7/23
[52] U.S. Cl. ..................................... 363/65; 363/70; 307/82
[58] Field of Search ...................... 363/65, 67, 69, 70; 307/82

[56] References Cited

U.S. PATENT DOCUMENTS

| | | | |
|---|---|---|---|
| 3,808,452 | 4/1974 | Hutchinson | 307/64 |
| 3,988,661 | 10/1976 | McCoy | 321/2 |
| 4,013,938 | 3/1977 | McCoy | 321/14 |
| 4,074,182 | 2/1978 | Weischedel | 323/25 |
| 4,230,981 | 10/1980 | Rambold | 323/25 |
| 4,257,090 | 3/1981 | Kruger et al. | 363/65 |
| 4,628,433 | 12/1986 | Notohamiprodjo | 363/65 |
| 4,860,188 | 8/1989 | Bailey et al. | 363/65 |
| 5,036,452 | 7/1991 | Loftus | 307/82 |

Primary Examiner—Jeffrey Sterrett
Attorney, Agent, or Firm—William H. Steinberg

[57] ABSTRACT

A plurality of AC/DC converters connected in parallel, are provided in which any one of the power converters can fail with-out affecting the operation of the machine which the plurality of converters are providing power. The failed AC/DC converter can be removed and replaced by another converter without shutting down the system. The output voltage of each converter is sensed on the power supply side of a decoupling diode. This allows each one of the converters to operate with its own sense loop and, therefore, the feedback loop does not open when a converter is removed and another used in its place. Each of the parallel connected AC/DC converters is designed to provide a preset maximum power which is independent of AC line voltage variation. To limit the power, the control voltage is made inversely proportional to the average input AC line voltage. The output voltage of the AC/DC converter is made to vary as a function of the load. This allows all the converters in parallel to provide power to the load all the time.

16 Claims, 3 Drawing Sheets

POWER SYSTEM FOR PARALLEL OPERATION OF AC/DC CONVERTRS

BACKGROUND OF THE INVENTION

The present invention relates to a power system with several power converters operated in parallel supplying a load.

The output of parallel convertors are normally connected together through decoupling diodes to a system load, so that reverse current through a failed converter can be avoided. Parallel power supplies can be used to provide redundancy and where a single converter cannot supply the load power requirements. The output voltage feedback signal for the parallel converters is supplied from the load side of the decoupling diodes to provide precise voltage regulation.

One of the problems with using the load voltage as a feedback signal to all the parallel converters, is that due to minor converter circuit component variations in the individual converters, the output voltage of each of the converters will be different. The converter with the highest output voltage will forward bias the decoupling diode. The output of this converter, minus the decoupling diode forward drop, becomes the regulating voltage for the other converters in parallel. The regulating voltage appears to the other converters as an indication of over voltage, causing the output of the other converters to be reduced. With the feedback voltage remaining constant, the output voltage of the other converters will go down to zero. This could give a false indication while the unit or units are still functional. No amount of precision in the converter components will correct this problem, since a slight variation in any of the sense elements can cause one or more converters to shut off. In some systems the converters are kept from shutting off and are kept in an idle mode in which they do not provide power to the load.

In some power supplies with parallel converters, the output current of the each of the converters is sensed. A correction in the output voltage for each of the converters is made by complex circuitry until each of the power supplies delivers equal currents. All the parallel converters are interconnected and dependent on one another for proper operation. Replacement of a failed converter while the system is operating, referred to as hot plug in, is not possible. Because of the cross cabling between converters and complex circuitry, repair and maintenance of parallel power systems of this type is difficult.

It is an object of the present invention to provide a parallel power supply system which allows the removal and replacement of a defective converter without shutting the system down.

It is another object of the present invention to provide a parallel power system in which any power converter can fail without affecting the overall operation of the system.

It is yet another object of the present invention to provide a parallel power system in which each of the converters provides power to the load.

It is still another object of the present invention to provide a parallel power system that has reduced circuit complexity.

SUMMARY OF THE INVENTION

A plurality of parallel power converters are provided connected to a load through decoupling diodes. The output voltage of each of the converters is sensed on the power supply side of the decoupling diode. This feature lets each one of the converters operate with its own sense loop and, therefore, the feedback loop never opens as is the case with the prior art. In the worst case situation of mismatch of the output voltages of each converter, the decoupling diode might be reverse biased for very light load condition and will not provide any power to the load. However, the power supply stays powered on and will not turn off. For distributed power type of systems, the diode drop variation is not a major factor in voltage regulation.

Each one of the AC/DC converters connected in parallel is designed to provide a preset maximum power which is independent of AC line voltage variation. The power limit circuit is applicable to all types of topologies such as, boost or buck with or without a bulk input capacitor. To limit the power supplied by each of the converters, the control voltage is made inversely proportional to the average input AC line voltage. This can be done by exact or linear piecewise approximation.

For bulkless type of converters (high power factor switchers), the output voltage has a significant amount of ripple. This ripple is large for the converter carrying the heaviest load. This allows the converter with a lower voltage to deliver power at the valley of the ripple. If the bulkless AC/DC converters connected in parallel are powered by individual phases of a 3-phase AC line, the valleys of output ripple for various converters will occur at different instants of time. This is similar to a case of time shared power system architecture. It is possible due to high ripple content in the output of various converters whose output DC Voltage levels might be slightly different from one another due to component tolerances to deliver power at the valley of the ripple.

For distributed power, the output voltage need not be precise. The output voltage of AC/DC converter is made to vary as a function of the load. This feature allows various converters in parallel to provide load all the time. This technique prevents a sudden transient load hit in case one of the converters connected in parallel fails, because every one of the other converters in parallel at that time were active and providing power to the system.

DETAILED DESCRIPTION OF THE INVENTION

Figure 1:
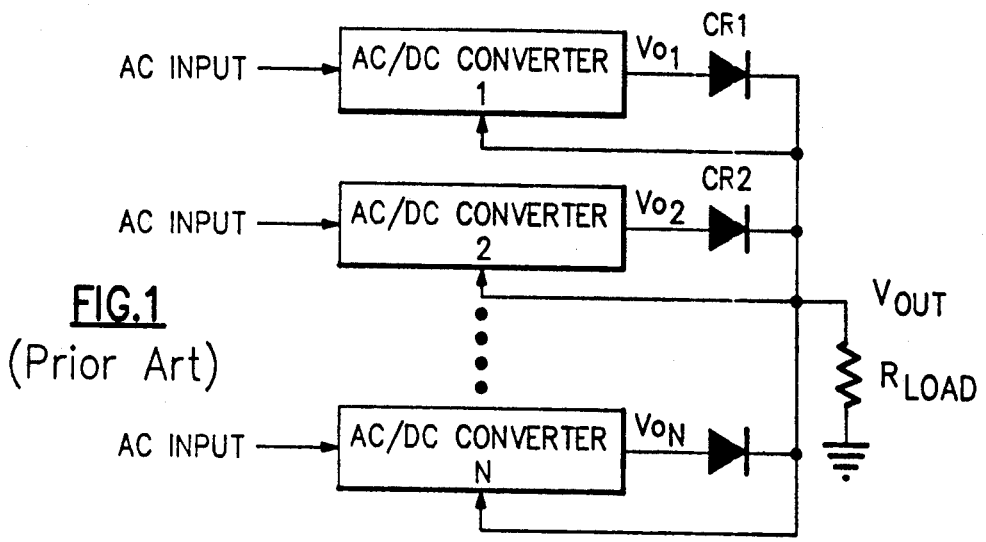
FIG. 1 is a part block diagram part schematic circuit representation of a prior art conventional redundant power supply system.

Referring now to the drawing and particularly FIG. 1 thereof, a conventional prior art redundant power supply system is shown wherein one or more power supplies are used to provide load power. Each one of the power supplies 1,2, ... N is connected to an AC input and provides power to a load via decoupling diodes CR1, CR2, ... CRN. A feedback signal is coupled from the output load RLOAD back to each of the power supplies for voltage regulation.

The problem with the above approach is that each of the power supplies in parallel will be regulated by the same output system bus voltage. Due to component tolerances, all the output voltages will not regulate to the same output voltage. The converter with the highest voltage will forward bias the decoupling diode. The output of this converter minus decoupling diode forward drop becomes the regulating voltage for the other converters in parallel. The feedback voltage to other converters appears as an indication of over voltage, causing their output voltages to reduce. As the feedback voltage stays constant, output voltage of each of the other converters will go down to zero. This could give a false indication of failure while the unit or units are still functional. Any amount of precise tolerance of the components will not correct this problem, because a slight variation in any one of the sense elements can cause one or the other converters to shut off. These types of schemes, with some circuit modification so that converters in parallel do not shut down, are generally used as, backup power source in case of the failure of a power supply located in parallel and are also used in redundant power systems.

Figure 2:
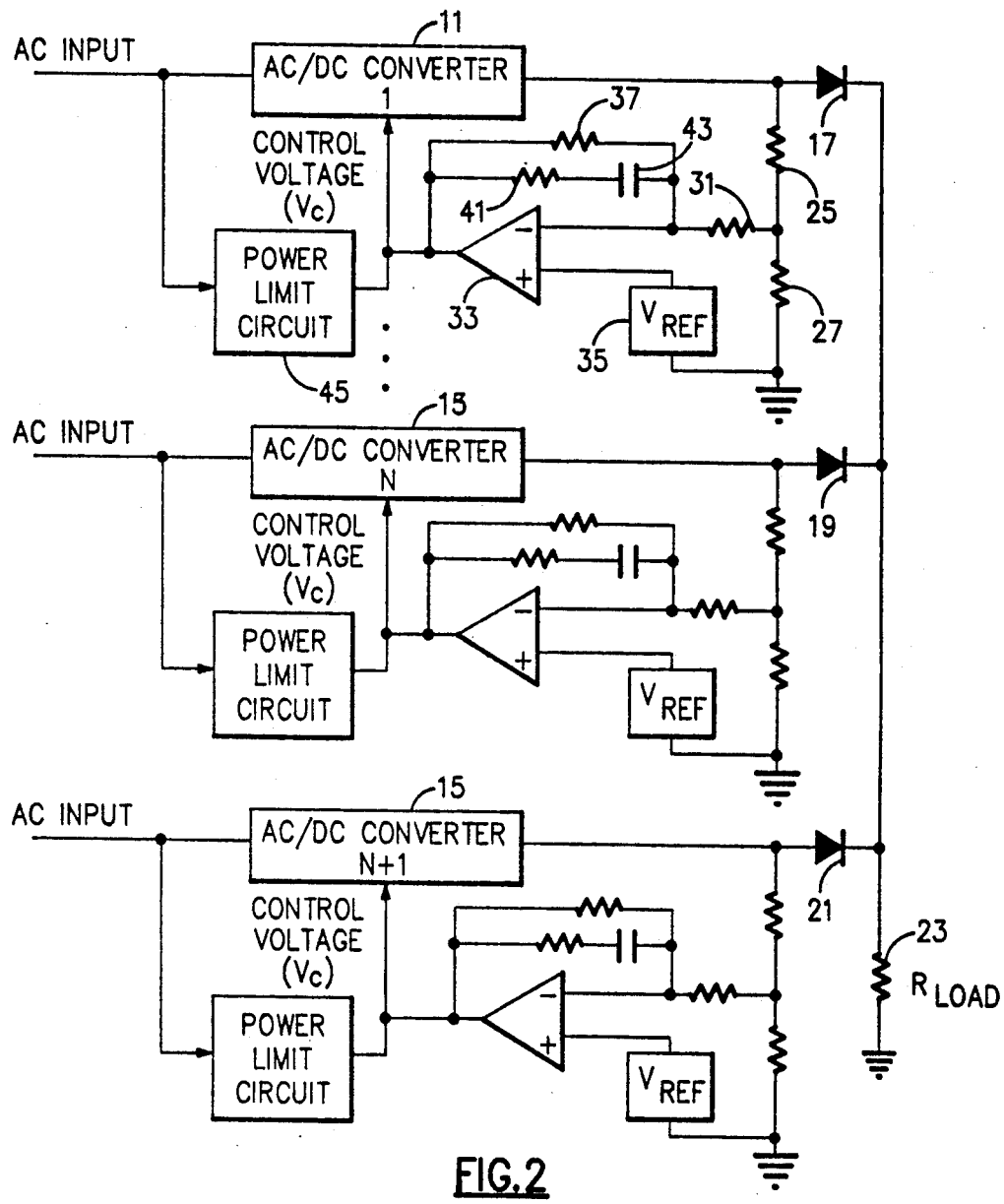
FIG. 2 is a part block diagram part schematic diagram representation of an N+1 power supply system with power limit and load dependent control signal in accordance with the present invention.

FIG. 2 shows the block diagram of a preferred embodiment of a circuit used to implement the desired features of an N+1 power system of the present invention. N+1 switch mode power converters, which can be DC—DC converters or AC/DC converters, are shown as AC/DC converters 11, 13, and 15 connected to an AC supply (not shown). The converters can be buck or boost switchmode power converters, with a conventional filter capacitor or a bulk capacitor. A high frequency capacitor is used to remove any high frequency components and not to provide any appreciable storage capability or AC ripple removal. Unlike totally redundant power systems where each converter has a backup, in an N+1 system at least N converters are needed to provide full system load power. In FIG. 2, N is equal to two, however N can be any number greater than or equal to one. The output of each of the converters 11, 13, and 15 is connected through a decoupling diode 17, 19, and 21, respectively, to a common load shown by a resistor 23. A feedback loop is connected to each of the converters and senses the output voltage of the converter on the supply side of the decoupling diode. The output voltage is connected to ground through a voltage divider including series connected resistors 25 and 27. The junction of resistors 25 and 27 is connected to resistor 31 to the inverting input of operational amplifier 33. A voltage reference 35 is connected between ground and the noninverting input terminal of the operational amplifier 33. Connected between the inverting input and the output of the operational amplifier 33 are the parallel combination of resistor 37 and series connected resistor 41 and stabilizing capacitor 43. A power limit circuit 45, shown in more detail in FIG. 3, is connected to the AC input and combines with the output of the operational amplifier 33 to provide a voltage control signal Vc.

Figure 3:
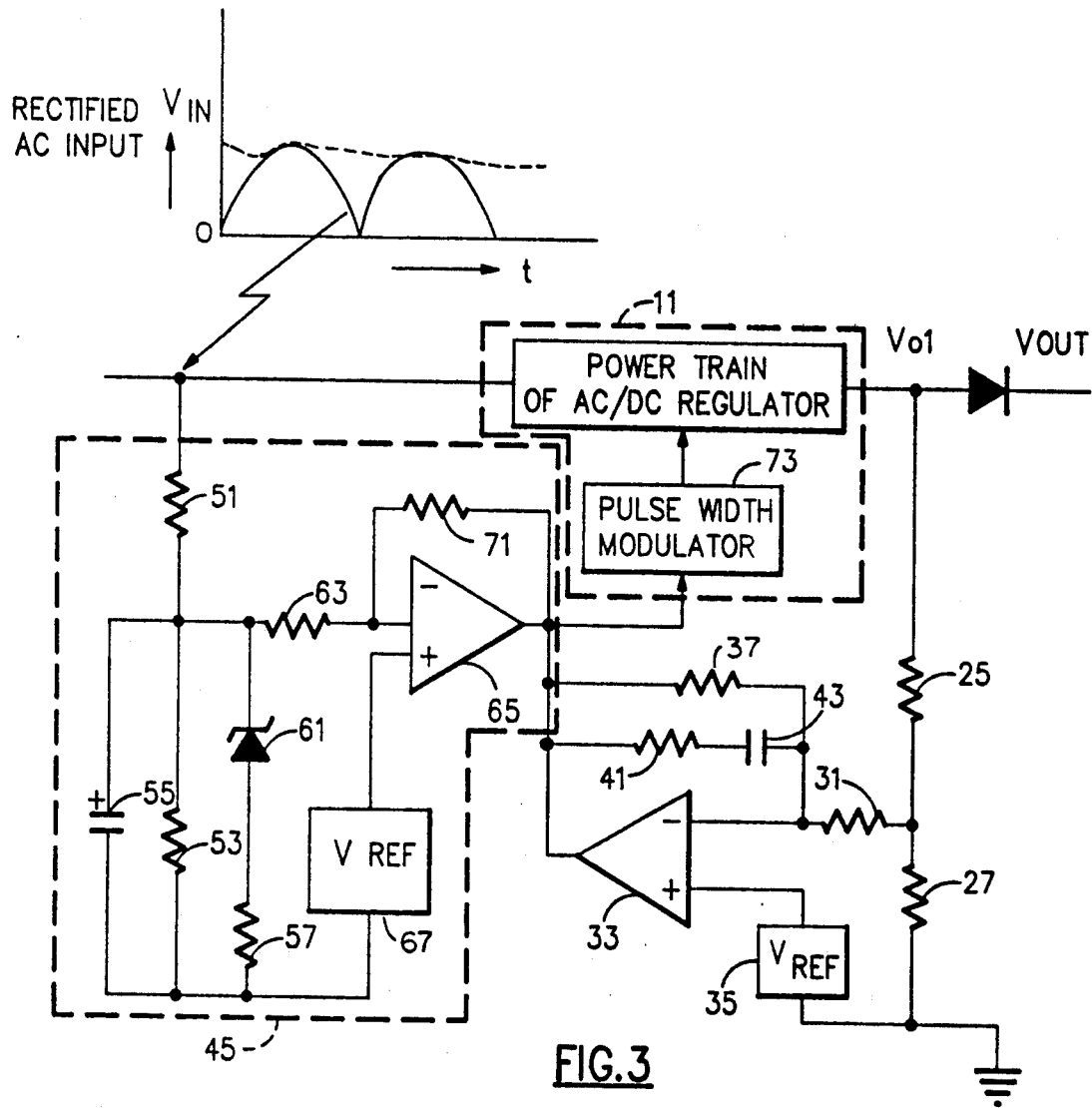
FIG. 3 is a part block diagram, part schematic diagram representation showing a portion of the AC/DC converter including a piecewise power limit circuit.

Referring now to FIG. 3 the power limit circuit 45 is shown for implementing a two part linear approximation of the trajectory of the control voltage and its interconnection with AC/DC converter 11. The full wave rectified input AC voltage is sensed by the series combination of resistors 51 and 53 and a capacitor 55 connected in parallel with resistor 53. The combination of a zener diode 61 in series with a resistor 57 is connected in parallel with resistor 53. The cathode of zener diode is connected to the junction of resistor 51 and 53. A resistor 63 is connected between the junction of resistors 51 and 53 and the inverting input of an operational amplifier 65. A voltage reference 67 is connected between the common junction of resistors 53 and 57 and the noninverting input of the operational amplifier 65. A feedback resistor 71 is connected between the inverting input terminal and the output of the operational amplifier. The output of the operational amplifier 65 and the output of the operational amplifier 33 are connected together to provide the control voltage which is connected to a pulse width modulator 73 which is part of the AC/DC converter 11.

In operation, the circuit of FIG. 2 senses the load voltage from a point ahead of the decoupling diodes 17, 19, and 21. This makes it possible for each of the converters to operate under its own sensed output voltage and not to a common system bus voltage. This prevents the shutdown of any one of the converters in parallel because the feedback loop never opens, since the decoupling diode is not part of the feedback loop. Voltage reference 35 in the feedback loop is compared with the output voltage in operational amplifier 33 to create a feedback control signal.

Figure 5:
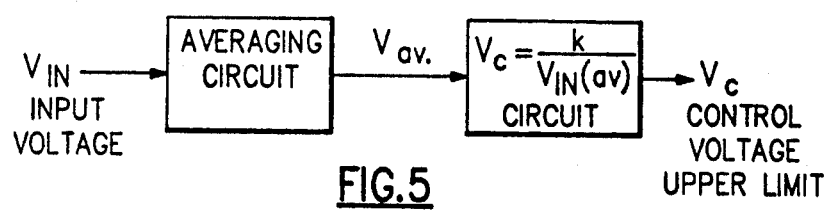
FIG. 5 is a block diagram showing an implementation of the characteristic shown in FIG. 4.
Figure 4:
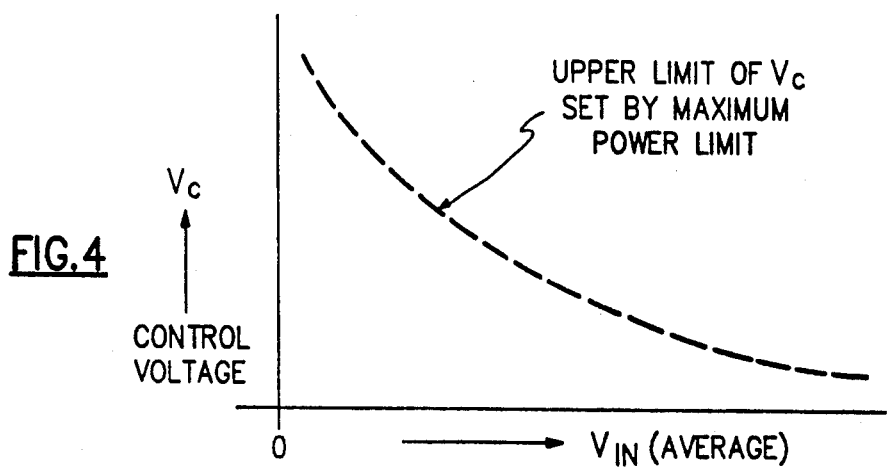
FIG. 4 is a graph of the desired control signal as a function of the average input voltage for an open loop control power supply for use with the power supplies of FIG. 2.

Unlike redundant power systems where a backup power supply is provided for each of the power supplies needed to supply the load, an N+1 system requires at least N systems for providing full system load power with one additional power supply for backup. A maximum power limit circuit 45 is built into each of the AC/DC converters. The trajectory of the control voltage as a function of average input voltage for maximum power delivered is shown in FIG. 4. This characteristic is realized by an analog circuit block diagram shown in FIG. 5. The full wave rectified input voltage is applied to an averaging circuit to produce an average voltage. An analog function is then realized by shaping the trajectory of control signal inversely proportional to the average line voltage. The feedback control signal and the power limit signal are connected to the same node of the AC/DC converter. Whichever is lower in magnitude assumes the control of the converter. The upper limit of control node voltage is set by the power limit circuit. Therefore, any particular AC/DC converter will be able to deliver up to a maximum power and no more. If the load current tends to increase, the output voltage of the converter will try to decrease by the following relation:

$$delta\ V01 = PMAX/delta\ IMAX$$

where V01 is the output voltage of the converter, PMAX is the maximum power limit, and IMAX is the current which flows when the output of the converter is limited by the power limit.

Figure 7:
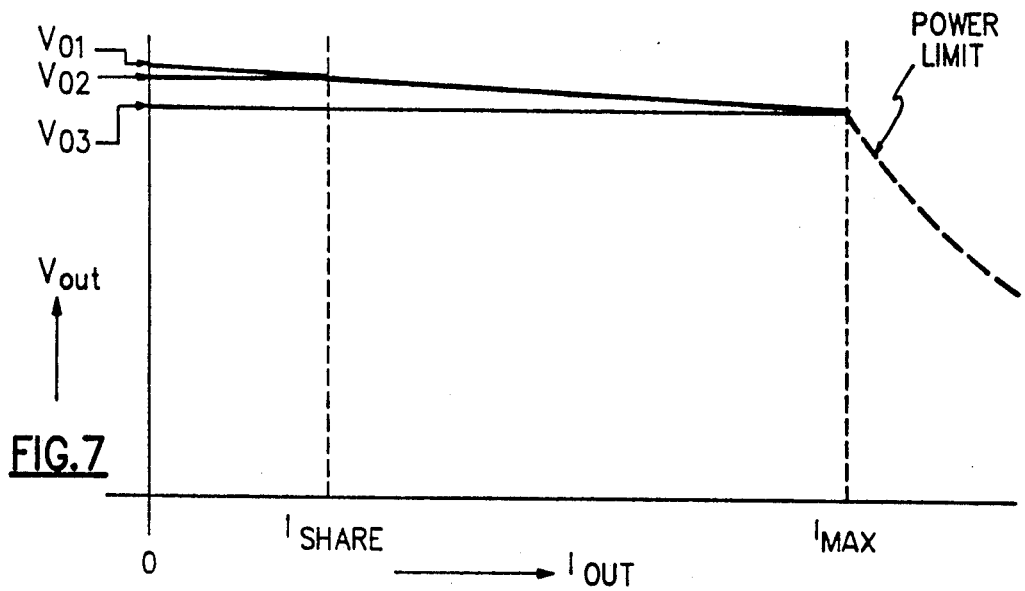
FIG. 7 is a graph of the load and output voltage characteristic of three converters in parallel operating in accordance with the present invention whose output voltages are different from one another.

The output voltage of the converter that was providing power tries to decrease in value when the converter reaches its maximum power level. When this voltage intersects with the output voltage of another converter in parallel, that converter starts picking up the additional load. This continues in a daisy chain fashion until all the converters in parallel provide maximum load at their individual maximum power limit level. This effect is shown in FIG. 7 whereby V01 and V02 intersect V03 when the system load reaches IMAX. The converters that have reached their maximum power limit will continue to operate at their maximum power capacity.

Figure 6:
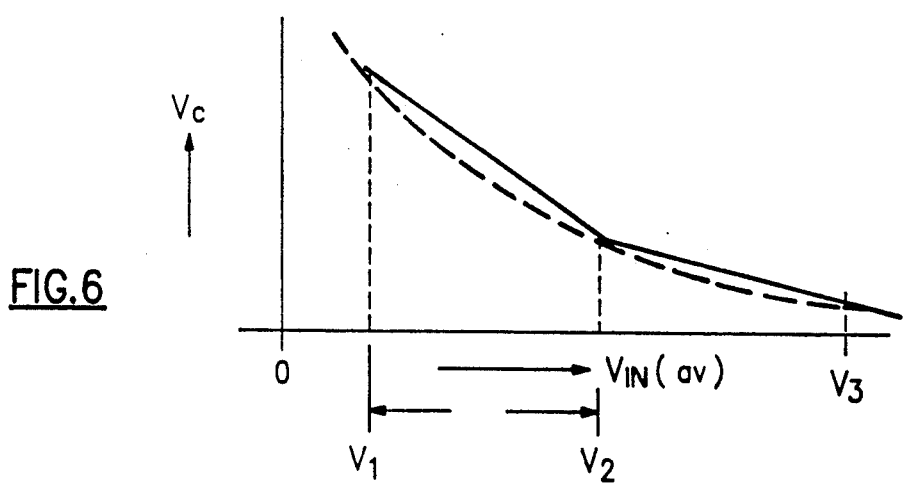
FIG. 6 is a graph of a piecewise linear approximation curve for the control voltage set by the maximum power limit as a function of average line voltage.

The trajectory of the control voltage for maximum power limit can be realized by piecewise linearization method. The ideal trajectory shown in FIG. 4 can be broken into two or more linear segments. A two part linear approximation, shown graphically in FIG. 6, achieves a maximum power limit approximation within 5%. The two part piecewise approximation is realized by the circuit 45 shown in FIG. 3. Resistors 51, 53 and capacitor 55 sense the average of the full wave rectified input voltage. This sensed voltage is inverted by operational amplifier 65 and resistors 71 and 63. The trajectory of the control node so obtained is shown in FIG. 6 by line segment with a slope of M1. The slope of this line is modified by zener diode 61 and resistor 57 starting at point V2 onward with a slope of M2. This linear approximation allows a constant maximum power limit over the full operational range of the power supply. The lower magnitude of the feedback control signal and the power limit signal controls the converter because of the low output impedance of the operational amplifiers. When the power limit voltage is higher than the voltage provided by the output voltage feedback loop, the current is sunk by operational amplifier 33 keeping the voltage at the lower level. Similarly, when the output feedback voltage is greater than the power limit voltage, current is sunk by operational amplifier 65 reducing the excess voltage, so that the pwm control receives the power limit voltage as the control voltage.

It is possible that only the converter which has the highest output will provide all the load power, if the converters are powered from a DC source or alternatively, the output voltages of the converters differ by more than the peak to peak ripple voltage at the system load point causing all the decoupling diodes to be reverse-biased. However, the bulkless converters are designed with an input capacitor which filters high frequencies with little effect on the ripple so that the valley of the ripple voltage drops below the output voltage of the parallel converters allowing other diodes to become forward-biased and start providing power to the load. Therefore, at various levels of load current, many of the converters in parallel will be active.

To improve load sharing, the output voltage is made to vary as a function of the load. As the load increases, its output voltage starts decreasing. When this voltage intersects with the voltage of another converter in parallel, that converter starts sharing the load. FIG. 7 shows that when V01 crosses V02 at ISHARE, both the converters start delivering power. This process continues as load increases. At approximately 10%-20% of full load, almost all the converters start carrying a portion of the load. The output voltage of a particular converter is related to its load by the expression;

$$V01 = ES - Z0 \cdot IOUT$$

where ES is the source voltage, Z0 is the converter impedance which is dependant on gain of the operational amplifier in the feedback loop, and IOUT is the output current of the converter.

Normally, the gain of the closed loop of a switching regulator is very high so that the output impedance is very low and the effect of load current on output voltage is minimal. For distributed power applications, output voltage regulation need not be very tight. Therefore, the output impedance is designed to be application specific by the proper selection of feedback loop components. The resistors 25, 27, 31, 37, and 41 and capacitor 43, are selected in a way so that the closed loop gain of the switching regulator provides an output impedance sufficient enough to vary the output voltage with variations of the load current. For example, if the output voltage drops linearly approximately 2.5% from no load to full load, participation of all the parallel converters will typically occur at 10-20% of full load.

The foregoing has described a power system for parallel operation of AC/DC converters which allows the removal and replacement of a defective converter without shutting the system down and in which each of the converters provides power to the load.

While the invention has been particularly shown and described with reference to a preferred embodiment thereof, it will be understood by those skilled in the art that various changes in form and details may be made therein without departing from the spirit and scope of the invention.

I claim:

1. An N+1 power supply system comprising:
   at least three power supplies for commonly providing power to a load at the same time, each power supply having feedback means for providing a control signal for controlling the output of said power supply as a function of load, each power supply having means for limiting the maximum power provided by said power supply; and
   at least three decoupling diodes, each decoupling diode connected to the output of a respective said power supply, said decoupling diode poled for conducting power from said power supply to the load, the load side of said decoupling diodes connected in parallel with one another, said feedback means being coupled to the output of the respective power supply before said decoupling diode so that said decoupling diode is not part of the feedback loop.

2. The system of claim 1 wherein said means for limiting the maximum power supplied by said power supply comprises generating means for generating a signal proportional to the average input voltage of the power supply and generating a control voltage inversely proportional to the averaged input voltage for setting an upper limit for the control signal.

3. The system of claim 2 wherein said generating means comprises a first resistor and a capacitor connected in parallel.

4. The system of claim 3 wherein said generating means further comprises a second resistor in series with the first resistor for setting the sensed value of the average input voltage.

5. The system of claim 4 wherein said means for limiting maximum power further comprises a third resistor in series with a zener diode, said series combination connected across said first resistor and modifying the sensed value of the average input voltage.

6. The system of claim 5 wherein said means for limiting maximum power further comprises fourth and fifth resistors in combination with a first operational amplifier for setting the gain of the amplifier and a reference source for setting the desired upper control level for maximum power limit.

7. The system of claim 6 wherein the feedback means comprises sixth and seventh resistors for sensing a output voltage.

8. The system of claim 7 wherein the feedback means further comprises a second operational amplifier, said sensed output voltage applied to the inverting input of said operational amplifier.

9. The system of claim 8 wherein the output of said first operational amplifier is connected to the output of said second operational amplifier so that the upper limit level on the control voltage for a predetermined maximum power delivered by each the power supplies in the N+1 configuration is set.

10. The system of claim 8 wherein the feedback means further comprises a reference voltage against which said sensed output voltage is to be compared, said reference voltage connected to the noninverting input of said second operational amplifier.

11. The system of claim 10 wherein the feedback means further comprises an eighth resistor connected between the junction of said sixth and seventh resistors and the inverting input of said second operational amplifier, a ninth resistor and tenth resistor, and a second capacitor, said ninth resistor connected in parallel with a series connection of said tenth resistor and said second capacitor, the parallel combination connected to provide feedback from the output of said second operational amplifier to said inverting input of said second operational amplifier.

12. The system of claim 11 wherein each of said power supplies include a pulse width modulator, the output of said second operational amplifier being connected to the input of said pulse width modulator, to vary the output of said power supply as a function of the output load.

13. The system of claim 2 wherein an output voltage of each of said power supplies varies inversely with load to promote load sharing between said power supplies as the load increases.

14. The system of claim 13 wherein said output voltage of each of said power supplies drops approximately 2.5% from no load to full load.

15. The system of claim 1 wherein an output voltage of each of said power supplies varies inversely with load to promote load sharing between said power supplies as the load increases.

16. The system of claim 15 wherein said output voltage of each of said power supplies drops approximately 2.5% from no load to full load.

* * * * *